Figure 1:
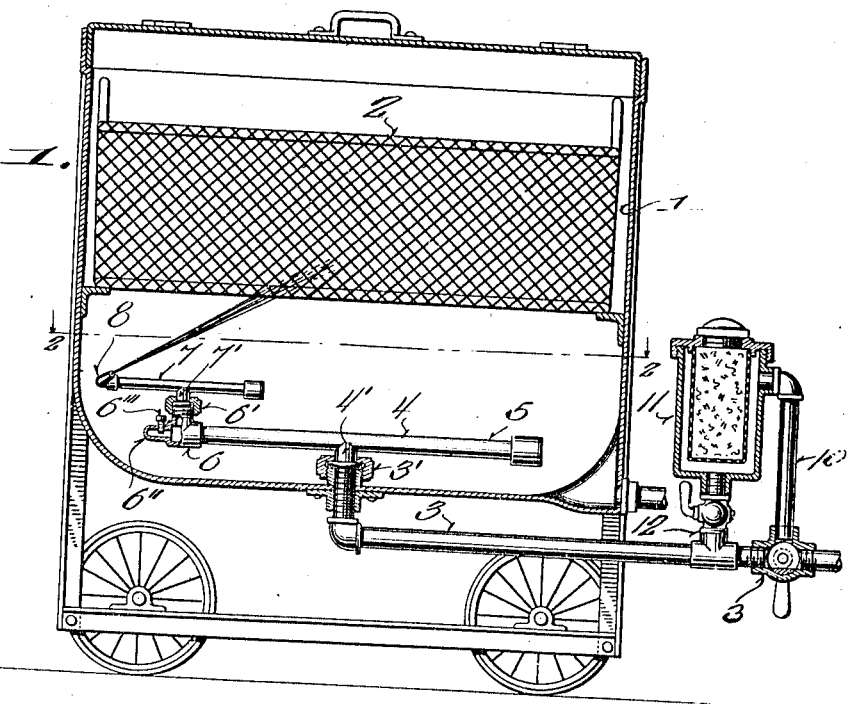

J. VAUDREUIL.
DISH WASHING MACHINE.
APPLICATION FILED MAR. 18, 1918.

1,314,622.

Patented Sept. 2, 1919.

UNITED STATES PATENT OFFICE.

JOHN VAUDREUIL, OF MILWAUKEE, WISCONSIN, ASSIGNOR TO SANITARY DISH WASHING MACHINE COMPANY, OF MILWAUKEE, WISCONSIN.

DISH-WASHING MACHINE.

1,314,622.

Specification of Letters Patent.  Patented Sept. 2, 1919.

Application filed March 18, 1918. Serial No. 223,102.

*To all whom it may concern:*

Be it known that I, JOHN VAUDREUIL, a citizen of the United States, and resident of Milwaukee, in the county of Milwaukee and State of Wisconsin, have invented certain new and useful Improvements in Dish-Washing Machines; and I do hereby declare that the following is a full, clear, and exact description thereof.

My invention refers to fluid distributers and the object of the invention is to provide a simple, economical and effective distributer so arranged and constructed that it will spread a fluid in a maximum area uniformly, while at the same time, the distribution is discharged at various angles.

The invention in this instance is shown in connection with a washing machine, but it is understood that it may be applied to various uses other than that mentioned.

With the above objects in view the invention consists in certain peculiarities of construction and combination of parts as hereinafter set forth with reference to the accompanying drawings and subsequently claimed.

In the drawings

Figure 2:
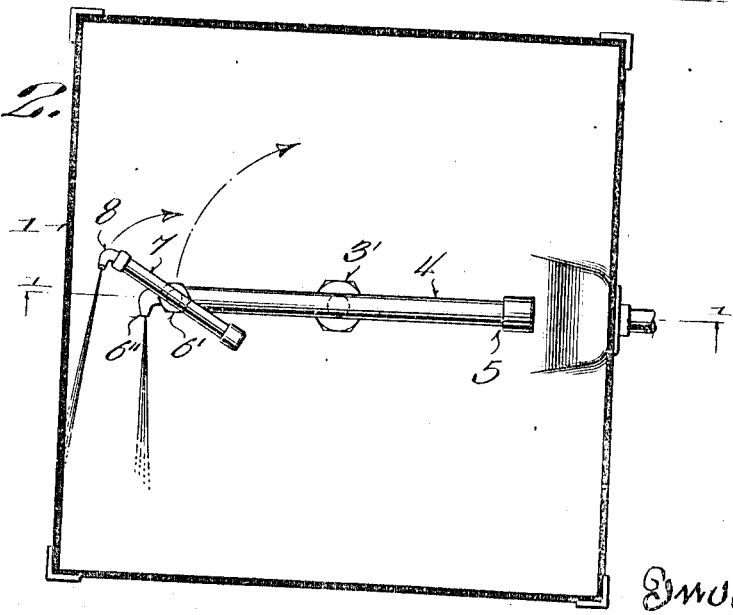

Figure 1 represents a sectional elevation of a washing machine showing a distributer mounted therein embodying the features of my invention, the section being indicated by line 1—1 of Fig. 2, and Fig. 2 is a sectional plan view of the same, the section being indicated by line 2—2 of Fig. 1.

Referring by characters to the drawings, 1 represents a container or tank having the usual hinged lid and carrying a screen basket 2 for the reception of dishes, the basket being supported in the upper portion of the container. The container in this instance is in the form of a wheeled truck, as shown, and the lower portion of the same forms a well, the center portion of which has extending upwardly therethrough a fluid supply pipe 3. The end of this fluid supply pipe is provided with a coupling 3' for the reception of a flanged hollow nipple 4' which constitutes a branch of a receiving tube 4. This tube is provided with a counterbalanced blind end 5 and the opposite open end of said tube has fitted thereto a discharge head 6. This head is also provided with a coupling 6' for the reception of a flanged nipple 7' that constitutes part of a distributing tube 7. The distributing tube 7 is in all respects similar to the receiving tube just described, except that it is of smaller dimensions having a blind counterbalanced end and an open discharge end, which latter carries a nipple 8 that is adapted to discharge upwardly at an angle.

As best shown in Fig. 2, the discharge head 6 is also provided with an inclined discharge nipple 6'' and the restricted passage through this nipple is regulated by a screw 6'''. The supply pipe 3 is arranged to be coupled to any suitable source of fluid supply by a hose, not shown, and it carries a controlling valve 9 which has a branch pipe 10 extending therefrom to the upper end of a soap or chemical reservoir 11. The lower end of the reservoir is provided with a valve-controlled lead-pipe 12 which communicates with the main supply pipe 3.

The means shown for supplying soap either in the dry form or liquid, forms no part of my present invention, but is particularly convenient and simple in construction. In its operation, if it is desired to supply a full strength of soap to the flow of water, the valve 9 may be turned so as to cause the main supply fluid to pass through the pipe 10 and thence through the reservoir and pipe 12 to the distributer. If liquid soap is used and a small supply required, the valve 9 may be turned so as to cut off the branch pipe 10 and in this case the flow of water or other fluid through pipe 3 will draw a sufficient supply of soap from the reservoir, which supply is regulated by the valve that is shown in pipe 12 and it is also understood that this valve can be cut off entirely if desired and, in conjunction with the valve 9, the soap reservoir may be entirely closed so as to supply a clear rinsing water only.

From the foregoing description it will be observed that the distributer, in general form, has a planetary movement, that is the receiving tube is caused to revolve at any desired speed which is controlled by the jet of fluid exhausted from the nipple 6' and this rotary movement can be increased or decreased by adjusting the screw 6'''.

As the receiving tube revolves about its axis, it will be observed that the discharge tube revolves similarly upon its axis due to the action of the fluid and the single jet delivered from the nipple 8 at an upward incline will thus constantly change its angle of discharge so as to insure cleansing the dishes in the basket above upon all surfaces. Attention is directed to the fact that the single jet is thus quite powerful in its force, whereby food particles such as egg and the like adhering to the dishes or vessels are readily removed. This strong single spray is maintained even under conditions where the pressure of the fluid is quite low and I consider this an important feature of my invention due to the fact that variation in the condition of water supply in different localities is a problem which must be met.

It will also be observed, owing to the planetary action of the distributer, that the main receiving tube will have what might be termed a more or less intermittent rotary movement which is caused by the rotation of the distributing tube in the same direction, that is, as the discharge nipple of the distributing tube completes a revolution in the opposite direction from that traveled by the main tube, there will be a slight retardation, which is particularly advantageous in the operation of the device.

The important feature of my invention is the arrangement whereby I have provided a main rotary receiving tube operating in conjunction with an auxiliary rotary distributing tube mounted upon one of its ends, thus insuring a single jet of the washing fluid being discharged in all directions upon the surfaces of the articles being cleaned.

It is also within the scope of my invention to invert the receiving arm with relation to the distributing arm in which case the distributing arm would be mounted above the articles to be washed in place of, as shown, being mounted below them.

I claim:

1. A dish washing machine including a casing, means for supporting articles in the casing, a vertical supply pipe in the casing at approximately the vertical axis thereof, a receiving tube intermediately swiveled at the supply pipe and communicating therewith, one end of the tube being closed and provided with a counter-balance weight, a discharge nozzle at the other end of the tube adapted to direct fluid against articles carried by said supporting means and to rotate the said receiving tube, a distributing tube revolubly mounted on the receiving tube adjacent the nozzle, and a discharge nozzle on one end portion of the distributing tube adapted to discharge water against articles carried by said supporting means and to rotate the distributing tube and to also impart differential rotative impulses to the receiving tube when the distributing tube is at and adjacent to parallel relation with the receiving tube.

2. A dish washing machine including a casing, means for supporting articles in the casing, a vertical supply pipe in the casing at approximately the vertical axis thereof, a receiving tube intermediately swiveled at the supply pipe and communicating therewith, one end of the tube being closed and provided with a counter-balance weight, a discharge head at the other end of the tube, a distributing tube revolubly mounted upon the discharge head, one end of said distributing tube being closed and provided with a counter-balance weight, and a discharge nozzle on one end portion of the distributing tube adapted to discharge water against articles carried by said supporting means and to rotate the distributing tube and to also impart differential rotative impulses to the receiving tube when the distributing tube is at and adjacent to parallel relation with the receiving tube.

In testimony that I claim the foregoing I have hereunto set my hand at Milwaukee, in the county of Milwaukee and State of Wisconsin.

JOHN VAUDREUIL.